(12) United States Patent
Ozaki (10) Patent No.: US 8,879,126 B2
(45) Date of Patent: Nov. 4, 2014

(54) IMAGE READING DEVICE

(75) Inventor: Kazumasa Ozaki, Naogya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 295 days.

(21) Appl. No.: 13/359,719

(22) Filed: Jan. 27, 2012

(65) Prior Publication Data

US 2012/0194875 A1 Aug. 2, 2012

(30) Foreign Application Priority Data

Jan. 28, 2011 (JP) .................. 2011-016768

(51) Int. Cl.
*H04N 1/04* (2006.01)
*H04N 1/40* (2006.01)
*H04N 1/203* (2006.01)

(52) U.S. Cl.
CPC .............. *H04N 1/40* (2013.01); *H04N 1/2032* (2013.01); *H04N 1/40056* (2013.01)
USPC ............ 358/448; 358/471; 358/474; 358/498

(58) Field of Classification Search
None
See application file for complete search history.

(56) References Cited

FOREIGN PATENT DOCUMENTS

| JP | H11-136442 | 5/1999 |
| JP | 2005-191885 A | 7/2005 |

*Primary Examiner* — Marivelisse Santiago Cordero
*Assistant Examiner* — Moustapha Diaby
(74) *Attorney, Agent, or Firm* — Scully, Scott, Murphy & Presser, PC (57) ABSTRACT

An image reading device includes a first reading unit, second reading unit, and determining unit. The first and second reading units are configured to read one surface and another surface of an original, respectively. The second reading unit is disposed downstream of the first reading unit with respect to a conveying path. The determining unit determines, based on read data obtained by reading the one surface with the first reading unit before the original is arrived at the second reading unit, whether or not an image is formed on the one surface. The first reading unit continues reading the one surface and the second reading unit fails to read another surface when an image is formed on the one surface. The second reading unit reads another surface and the first reading unit fails to read the one surface when an image is not formed on the one surface.

11 Claims, 8 Drawing Sheets

IMAGE READING DEVICE

CROSS REFERENCE TO RELATED APPLICATION

This application claims priority from Japanese Patent Application No. 2011-016768 filed Jan. 28, 2011. The entire content of the priority application is incorporated herein by reference.

TECHNICAL FIELD

The present invention relates to an image reading device.

BACKGROUND

A conventional image-reading device has two separate reading units for reading each surface of an original sheet. When the conventional image-reading device described above reads an original sheet having an image formed on only one surface, there can be uncertainty as to which direction the surface containing an image is facing when the original sheet is conveyed along the original sheet-conveying path. In particular, if the image-reading device possesses a double-sided read function and this function is used frequently, the user may be uncertain as to which orientation to set an original sheet having an image on only one surface. The conventional image-reading device described above that possesses a double-sided read function is said to use this double-sided read function to read both surfaces of the original sheet, even when the original sheet has an image formed on only one surface. In this way, the image-reading device can read the surface of the original sheet on which an image is formed, regardless of the orientation of the original sheet when the original sheet is set in the image-reading device.

SUMMARY

Thus, the conventional image-reading device described above must always read both surfaces of the original sheet, even when an image is formed on only one surface of the document. Further, the two reading units for reading both surfaces of the original sheet in the conventional image-reading device may be disposed at equivalent positions along the original sheet-conveying path. With this configuration, both reading units must read the original sheet simultaneously, increasing the load on the image-reading device during a reading process.

In view of the foregoing, it is an object of the invention to provide an image-reading device for reducing load on an image-reading device during a reading process for reading an original sheet having an image formed on only one surface of each sheet.

In order to attain the above and other objects, the invention provides an image reading device including a conveying path, a first reading unit, a second reading unit, a first determining unit, and a control unit. An original sheet is conveyed in the conveying path. The original sheet has one surface and another surface. The first reading unit is configured to read the one surface of the original sheet conveyed along the conveying path. The second reading unit is disposed downstream of the first reading unit with respect to the conveying path. The second reading unit is configured to read the another surface of the original sheet. The first determining unit is configured to determine, based on first read data that is obtained by reading the one surface of original sheet with the first reading unit before the original sheet is arrived at the second reading unit, whether or not an image is formed on the one surface of the original sheet. The control unit is configured to control the first reading unit to continue reading the one surface of the original sheet to acquire second read data including the first read data and control the second reading unit to fail to read the another surface of the original sheet when the first determining unit determines that an image is formed on the one surface of the original sheet. The control unit is further configured to control the second reading unit to read the another surface of the original sheet to acquire third read data and halt the first reading unit to read the one surface of the original sheet when the first determining unit determines that an image is not formed on the one surface of the original sheet.

According to another aspect, the present invention provides an image reading method executed by an image reading device. The image reading device includes a first reading unit and a second reading unit that is disposed downstream of the first reading unit with respect to a conveying path. The image reading method includes: reading one surface of an original sheet by the first reading unit before the original sheet is arrived at the second reading unit; determining, based on first read data read by the first reading unit, whether or not an image is formed on the one surface of the original sheet; controlling the first reading unit to continue reading the one surface of the original sheet to acquire second read data including the first read data and controlling the second reading unit to fail to read another surface of the original sheet when an image is formed on the one surface of the original sheet; and controlling the second reading unit to read the another surface of the original sheet to acquire third read data and halting the first reading unit to read the one surface of the original sheet when an image is not formed on the one surface of the original sheet.

According to another aspect, the present invention provides a non-transitory computer readable storage medium storing a set of program instructions installed on and executed by a computer for controlling an image reading device. The image reading device includes a first reading unit and a second reading unit that is disposed downstream of the first reading unit with respect to a conveying path. The program instructions includes: reading one surface of an original sheet by the first reading unit before the original sheet is arrived at the second reading unit; determining, based on first read data read by the first reading unit, whether or not an image is formed on the one surface of the original sheet; controlling the first reading unit to continue reading the one surface of the original sheet to acquire second read data including the first read data and controlling the second reading unit to fail to read another surface of the original sheet when an image is formed on the one surface of the original sheet; and controlling the second reading unit to read the another surface of the original sheet to acquire third read data and halting the first reading unit to read the one surface of the original sheet when an image is not formed on the one surface of the original sheet.

BRIEF DESCRIPTION OF THE DRAWINGS

The particular features and advantages of the invention as well as other objects will become apparent from the following description taken in connection with the accompanying drawings, in which.

DETAILED DESCRIPTION

1. Mechanical Structure of a Multifunction Peripheral

Figure 1:
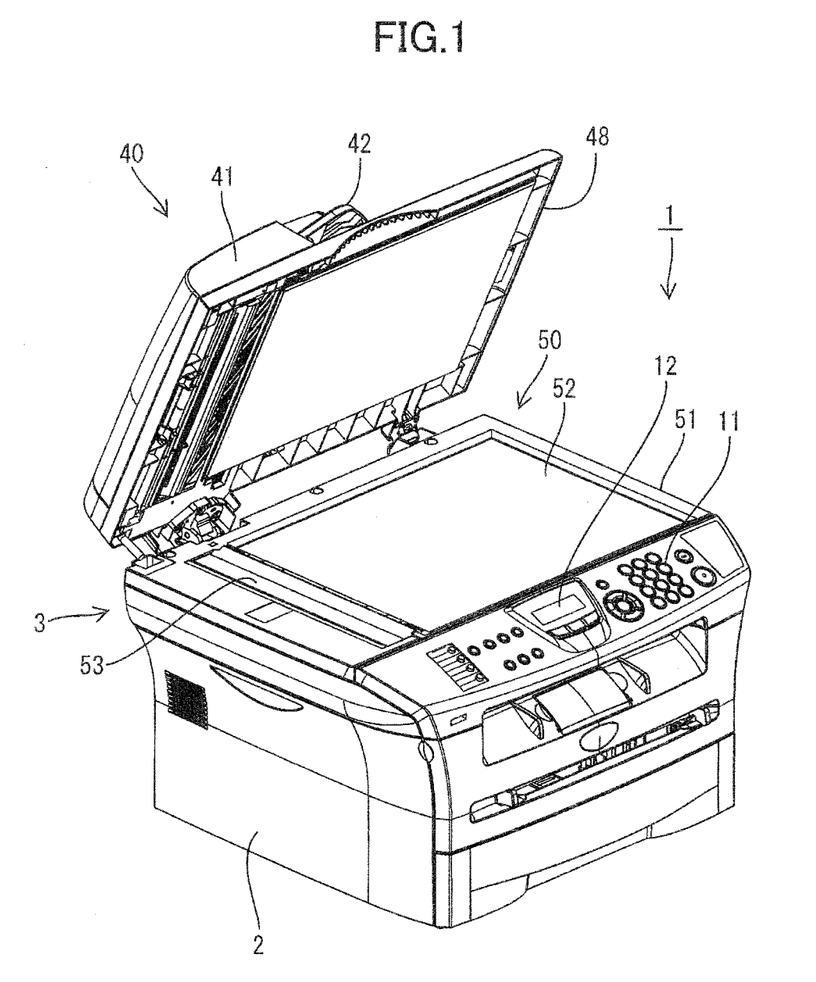
FIG. 1 is a perspective view showing an outer appearance of a multifunction peripheral including an image reading device according to a first embodiment of the present invention.

A multifunction peripheral (MFP) 1 has an original sheet cover 48 that is rotated upward into its open state in FIG. 1. The MFP 1 is provided with multiple functions, including a printer function, a scanner function, a copier function, and a facsimile function.

As shown in FIG. 1, the MFP 1 includes a main body 2, and an image-reading device 3 disposed on top of the main body 2 for reading original sheets. The image-reading device 3 includes a reading unit 30 described later with reference to FIG. 2, an automatic document feeder (ADF) 40, and a flatbed unit 50.

The flatbed unit 50 includes a frame 51, and a first platen glass 52 and a second platen glass 53, each formed of a transparent glass plate. The original sheet cover 48 can open and close over the flatbed unit 50 to reveal and cover the same.

The original sheet cover 48 is rotatably coupled to the rear side of the main body 2 (where the side of the main body 2 possessing an operation unit 11 and a display unit 12 described later will be considered the front side). The original sheet cover 48 is capable of rotating between a closed position for covering the flatbed unit 50 and an open position for exposing the flatbed unit 50. The ADF 40 is provided on top of the original sheet cover 48.

Figure 2:
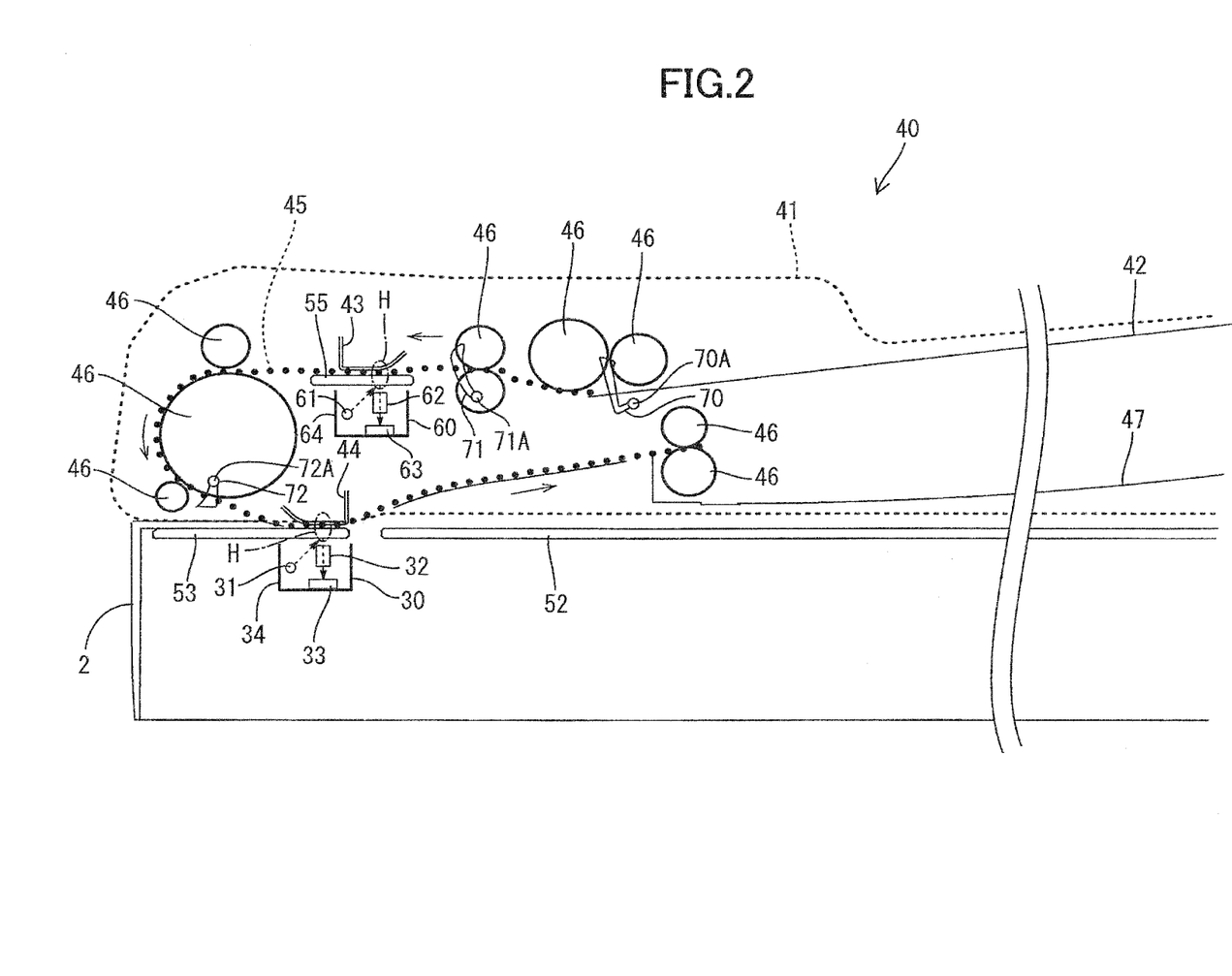
FIG. 2 is a cross-sectional view of the image-reading device when an original cover is closed.

FIG. 2 is a cross-sectional view of the image-reading device 3 when the original sheet cover 48 has been lowered to its closed position. As shown in FIG. 2, the ADF 40 includes an ADF cover 41, an original sheet tray 42, pressing members 43 and 44, various rollers 46, a discharge tray 47, a third platen glass 55 formed of a transparent glass plate, a reading unit 60, and document sensors 70-72.

A conveying path 45 is formed in the ADF 40. The conveying path 45 extends from the original sheet tray 42 to the discharge tray 47. The rollers 46 and the like convey original sheets along the conveying path 45. The reading units 60 and 30 are both disposed adjacent to the conveying path 45.

The reading unit 60 is disposed on the upstream side of the reading unit 30 with respect to the conveying path 45 (i.e., closer to the original sheet tray 42). When an original sheet is conveyed along the conveying path 45, the reading unit 60 reads one surface of the original sheet as the original sheet passes over the third platen glass 55. The reading unit 60 is disposed inside the conveying path 45, which describes a generally circular path. As an original sheet is conveyed along the conveying path 45, the reading unit 60 reads the surface of the document on the inner side of the conveying path 45 (hereinafter referred to as the "back surface"). The pressing member 43 confronts the reading unit 60 with the third platen glass 55 interposed therebetween. The pressing member 43 functions to press the original sheet against the third platen glass 55 so that the original sheet does not float off the third platen glass 55 when passing over the same.

The reading unit 30 is disposed downstream of the reading unit 60 with respect to the conveying path 45 (i.e., closer to the discharge tray 47). The reading unit 30 reads an original sheet conveyed along the conveying path 45 as the original sheet passes over the second platen glass 53. The reading unit 30 is disposed on the outside of the generally circular conveying path 45 and functions to read the surface of the original sheet on the outer side of the conveying path 45 (hereinafter referred to as the "front surface"). The pressing member 44 confronts the reading unit 30 with the second platen glass 53 interposed therebetween. The pressing member 44 functions to press the original sheet against the second platen glass 53 so that the original sheet does not float off the second platen glass 53 when passing over the same.

The document sensor 70 is disposed adjacent to the original sheet tray 42. A shaft 70A is provided on the underside of the original sheet tray 42 for rotatably supporting the document sensor 70. The document sensor 70 is connected to a central processing unit (CPU) 20 that will be described later in greater detail. The document sensor 70 outputs a signal to the CPU 20, enabling the CPU 20 to detect when an original sheet is set in the original sheet tray 42. The document sensor 71 is disposed adjacent to the reading unit 60 on the upstream side of the reading unit 60 with respect to the conveying path 45. Similarly, the document sensor 72 is disposed adjacent to the reading unit 30, upstream of the reading unit 30 but downstream of the reading unit 60 with respect to the conveying path 45. The document sensors 71 and 72 are also rotatably supported by respective shafts 71A and 72A.

The document sensors 71 and 72 are also connected to the CPU 20 and output a signal to the same. The CPU 20 detects the original sheet approaching the reading unit 60 based on the signal outputted from the document sensor 71 and detects the original sheet approaching the reading unit 30 based on the signal outputted from the document sensor 72.

When the document sensor 70 detects the presence of an original sheet in the original sheet tray 42, the CPU 20 controls the ADF 40 to drive the rollers 46 in order to convey the original sheet in the original sheet tray 42 through the conveying path 45 one sheet at a time. Each original sheet conveyed through the conveying path 45 passes over the third platen glass 55 and second platen glass 53 positioned along the conveying path 45 and is discharged into the discharge tray 47.

During this conveying operation, the CPU 20 detects when an original sheet has arrived at the reading unit 60 based on the signal from the document sensor 71 and controls the reading unit 60 to read the back surface of the sheet as the sheet passes over the third platen glass 55. Similarly, the CPU 20 detects when the sheet has arrived at the reading unit 30 based on the signal outputted from the document sensor 72 and controls the reading unit 30 to read the front surface of the original sheet as the sheet passes over the second platen glass 53. Since the reading unit 30 is disposed downstream of the reading unit 60 along the conveying path 45, the reading unit 30 begins reading the front surface of the original sheet a prescribed time after the reading unit 60 has begun reading the back surface of the original sheet, the prescribed time being the time it takes the sheet to be conveyed along the conveying path 45 from the reading unit 60 to the reading unit 30.

Next, the structures of the reading units 30 and 60 will be described. Since the reading units 30 and 60 each have the same structure, the reading unit 30 will be used as an example in the following description, with the reference numbers for components in the reading unit 60 included in parentheses.

The reading unit 30 (60) employs a compact image sensor (CIS) for reading an original sheet that passes over the second platen glass 53. The reading unit 30 includes a linear image sensor 33 (63) having a plurality of light-receiving elements arranged linearly in a one-dimensional array in a direction orthogonal to the surface of the drawing in FIG. 2; a light source 31 having light-emitting diodes for the three RGB colors; a rod lens array 32 (62) focusing reflected light from the light source 31 reflected off the original sheet onto each of the light-receiving elements of the linear image sensor 33; a carriage 34 (64) on which the linear image sensor 33, light source 31, and rod lens array 32 are mounted; and a conveying mechanism (not shown) for conveying the carriage 34.

The light source 31 irradiates light into a reading area H opposite the linear image sensor 33. The linear image sensor 33 detects the luminance and chromaticity (an example of density) of light reflected off the reading area H and received by the light-receiving elements. A portion of the conveying path 45 passes through the reading area H. Therefore, when an original sheet conveyed through the conveying path 45 passes over the second platen glass 53, the linear image sensor 33 detects light reflected off the surface of the original sheet in contact with the second platen glass 53 through the transparent second platen glass 53.

The reading area H is divided into a plurality of sub-regions equivalent to the number of light-receiving elements. Each light-receiving element detects light reflected off of one of the sub-regions and repeats this detection at prescribed intervals. Accordingly, when an original sheet conveyed through the conveying path 45 passes over the second platen glass 53, sub-region data sets of a number equivalent to the number of light-receiving elements are detected along a direction orthogonal to the conveying direction of the conveying path 45, and sub-region data sets of a number equivalent to the number of detections determined by the prescribed intervals of the light-receiving elements and the conveying speed of the original sheet are detected in the conveying direction of the conveying path 45. In other words, the light-receiving elements can detect light reflected off the surface of the original sheet contacting the second platen glass 53 within sub-regions constituting the surface of the original sheet divided by the number of light-receiving elements and the number of detections by the light-receiving elements. The linear image sensor 33 acquires the sub-region data sets detected by each of the light-receiving elements. In other words, the front surface of the original sheet has a prescribed area corresponding to the reading area and the image processors 28 counts a number of sub-regions of back surface having a higher than or equal to the prescribed threshold density K.

Note that the reading unit 30 is not limited to a CIS type, but may have a charged coupled device (CCD) as its image sensor. Further, the reading units 30 and 60 do not necessarily need to have the same structure. For example, one of the reading units 30 and 60 may be a CIS type and the other a CCD type.

On its front side, the MFP 1 is further provided with the operation unit 11 that includes various buttons through which a user can input operations and commands, and a display unit 12 configured of an LCD for displaying the status of the MFP 1.

2. Electrical Structure of the Multifunction Peripheral

Figure 3:
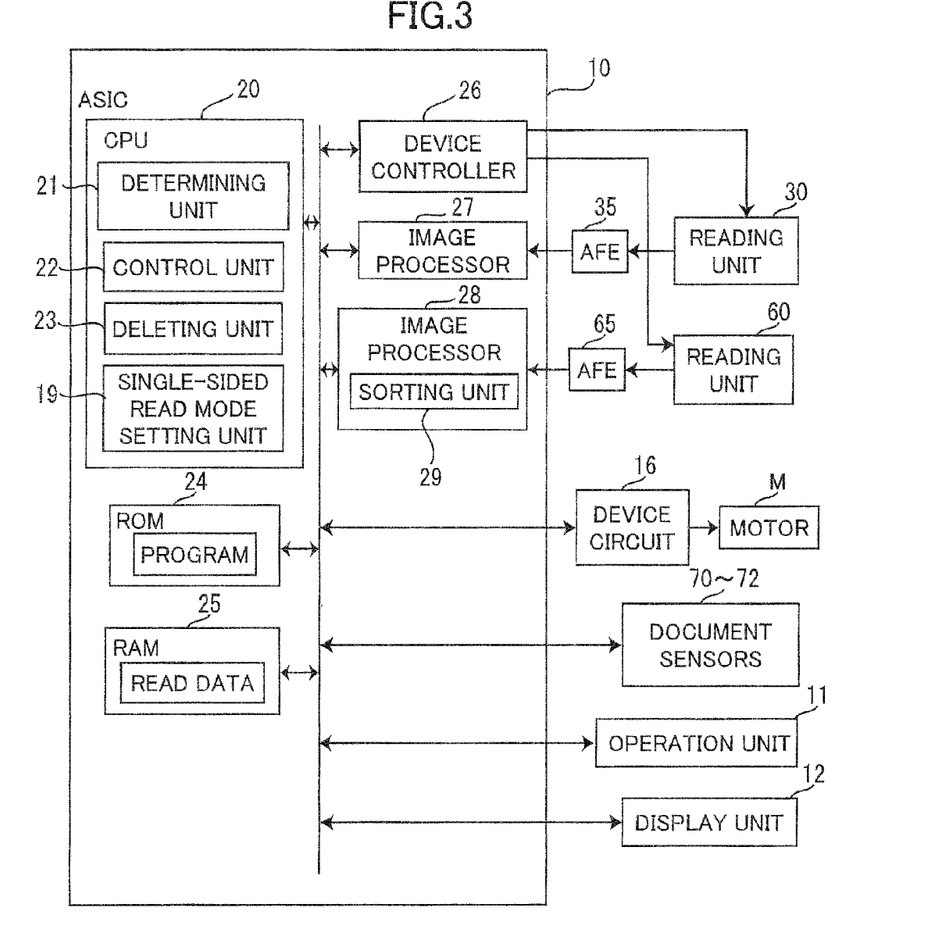
FIG. 3 is a block diagram showing an electrical structure of the multifunction peripheral.

As shown in FIG. 3, the MFP 1 includes an application-specific integrated circuit (ASIC) 10 for controlling the components of the MFP 1. The ASIC 10 includes the CPU 20, a ROM 24, a RAM 25, a device controller 26, and image processors 27 and 28. The components in the ASIC 10 are connected to the operation unit 11, display unit 12, reading units 30 and 60, and a drive circuit 16. The drive circuit 16 is connected to a motor M that drives the rollers 46 (see FIG. 2).

The ROM 24 stores various programs that control operations of the MFP 1. The CPU 20 reads programs from the ROM 24 and executes these programs to control components of the MFP 1. The CPU 20 can function as a determining unit 21, a control unit 22, a deleting unit 23, a single-sided read mode setting unit 19 for setting the image reading device 3 to the single-side read mode, and the like. The determining unit is configured to determine, based on read data that is obtained by reading one surface of original sheet with the reading unit 60 before the original sheet is arrived at the reading unit 30, whether or not an image is formed on the one surface of the original sheet. The control unit is configured to control the reading units 30 and 60.

The device controller 26 is connected to the reading units 30 and 60 and transmits signals to the reading units 30 and 60 for controlling the same. Specifically, the device controller 26 controls the reading units 30 and 60 to respectively light the light sources 31 and 61 (FIG. 2) and to read image data with the linear image sensors 33 and 63 (FIG. 2). The analog read data read by the reading units 30 and 60 is respectively transmitted to analog front ends (AFEs) 35 and 65 having A/D converter circuits. The AFEs 35 and 65 convert the analog read data to digital form and transmit the result to the image processors 27 and 28, respectively.

Upon receiving the read data from the reading units 30 and 60 via the AFEs 35 and 65, the image processors 27 and 28 perform light intensity adjustments, shading compensation, and other image processing based on commands received from the CPU 20 and store the resulting read data in the RAM 25.

Figure 5:
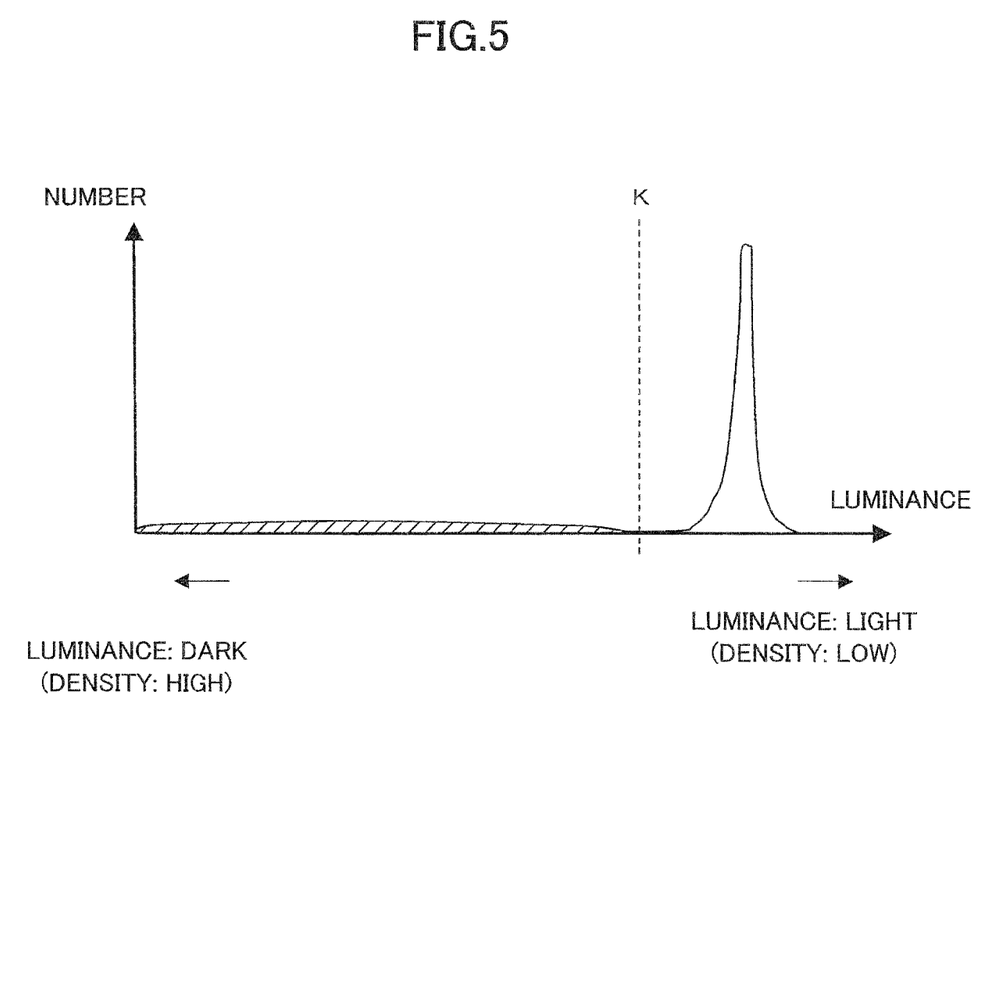
FIG. 5 is a graph showing an example of read data acquired by reading one surface of original sheet.

As illustrated in FIG. 5, the image processor 28 also executes a statistical process on read data received from the reading unit 60 in response to commands from the CPU 20. A predetermined threshold K is stored in the image processor 28. The image processor 28 reads luminance values from the read data for each sub-region data set and sorts the sub-region data sets into data having a luminance greater than or equal to the threshold K (that is, data having a colorant density less than the threshold K) and having a luminance less than the threshold K (that is, data having a colorant density greater than or equal to the threshold K). In other words, the sorting unit 29 sorts each of the plurality of sub-regions of front surface into a first sub-region and a second sub-region. Specifically, the sorting unit 29 sorts a sub-region having a density higher than or equal to the prescribed threshold density into the first sub-region, and sorts a sub-region having a density lower than the prescribed threshold density into the second sub-region.

The image processor 28 also executes a process in response to commands from the CPU 20 to count the number of sub-region data sets having a luminance less than the threshold K (i.e., the number of sub-regions in which sub-region data was detected). Here, the image processor 28 functions as a sorting unit 29 to perform a thresholding process on the read data using the threshold K. In this thresholding process, the image processor 28 converts the luminance of sub-region data to white luminance when the data has a luminance greater than or equal to the threshold K, and to black luminance when the data has a luminance less than the threshold K.

The image processor 28 counts the number of sub-region data sets having luminance less than the threshold K by counting the number of sub-region data sets converted to black luminance. After counting the number of sub-region data sets having luminance less than the threshold K, the image processor 28 returns the luminance of the sub-region data to the pre-conversion value and ends the current process.

3. Reading Process

Next, a reading process performed by the CPU 20 of the ASIC 10 using the ADF 40 of the MFP 1 will be described with reference to FIGS. 4 and 5. In this example, the CPU 20 is performing a process to read a plurality of original sheets each having an image formed on only one surface of each sheet.

Figure 4:
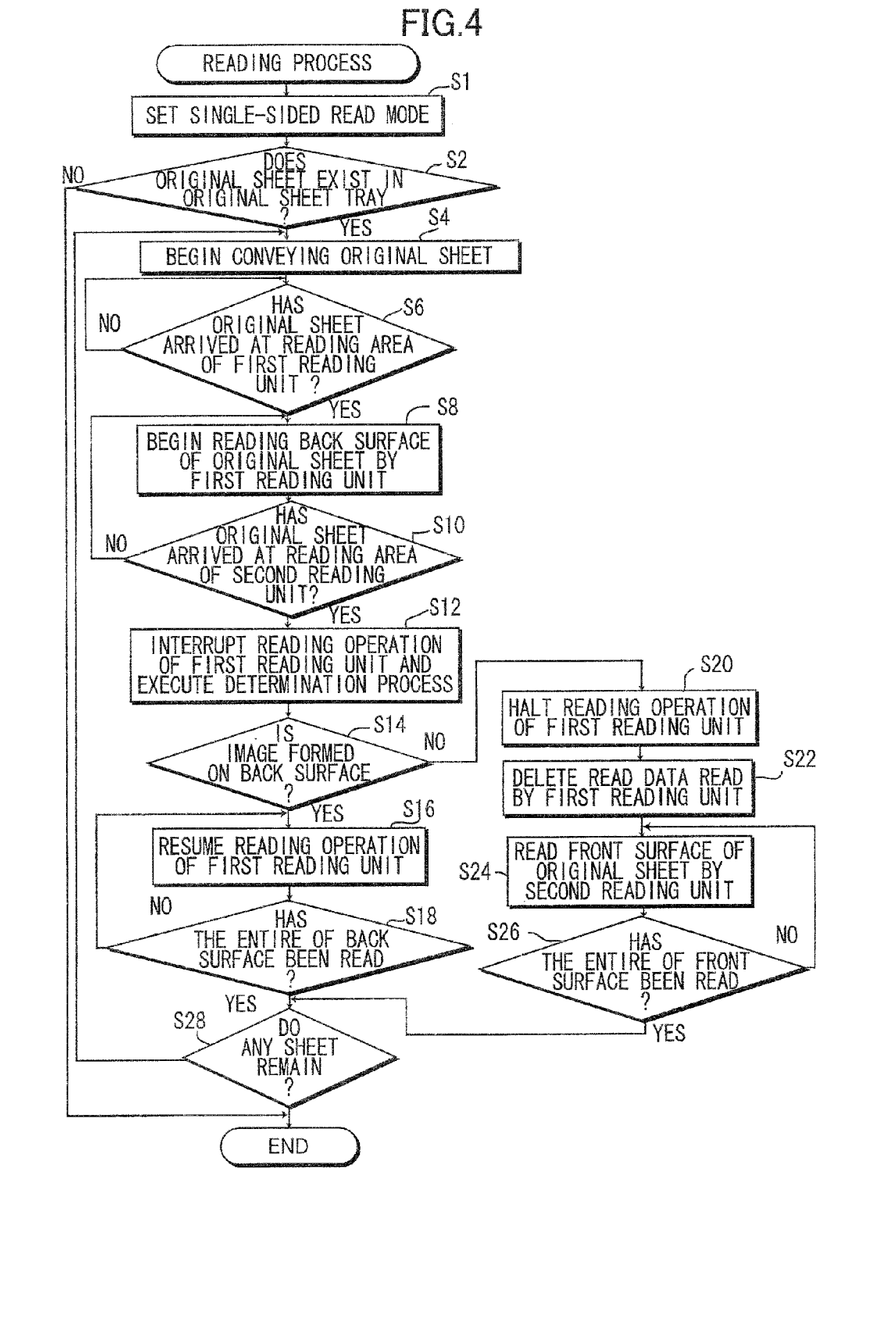
FIG. 4 is a flowchart illustrating steps in a reading process according to the first embodiment.

FIG. 4 is a flowchart illustrating steps in a reading process according to the first embodiment. The CPU 20 executes this reading process based on a prescribed program. When the user sets an original sheet in the original sheet tray 42 of the MFP 1, selects a read mode through the operation unit 11 or a display unit 12 capable of accepting input for reading an original sheet having an image formed on only one surface of each sheet, and inputs a read command, in S1 the CPU 20 enters the single-sided read mode and the single-sided read mode setting unit 19 sets the image reading device 3 to the single-sided read mode. In S2 the CPU 20 determines whether an original sheet is present (exists) in the original sheet tray 42 based on the signal received from the document sensor 70. If an original sheet is not set in the original sheet tray 42 (S2: NO), the CPU 20 ends the current reading process.

However, if an original sheet is set in the original sheet tray 42 (S2: YES), in S4 the CPU 20 begins conveying the original sheet. More specifically, the CPU 20 controls the motor M and the drive circuit 16 to drive the rollers 46 (see FIG. 2) in order to convey the original sheet along the conveying path 45.

When the original sheet set in the original sheet tray 42 includes a plurality of sheets, the rollers 46 convey the bottommost sheet into the conveying path 45 first. The rollers 46 convey the original sheets such that the back surface of the sheets when the sheets are set in the original sheet tray 42 faces inward as the sheets are conveyed along the generally circular conveying path 45, and the front surface of the sheets when the sheets are set in the original sheet tray 42 faces outward. In this way, the reading unit 60 can read the back surface of the original sheet, and the reading unit 30 can read the front surface.

After the CPU 20 begins conveying the original sheet in S4, the CPU 20 verifies the position of the original sheet within the conveying path 45 using the document sensors 71 and 72. Specifically, the CPU 20 determines whether the leading edge of the original sheet conveyed in the direction indicated by arrows in FIG. 2 has arrived at the reading area H of the reading unit 60 based on a signal received from the document sensor 71. When the CPU 20 determines that the original sheet has arrived at the reading area H of the reading unit 60 (S6: YES), in S8 the CPU 20 controls the reading unit 60 to begin reading the back surface of the original sheet.

In S10 the CPU 20 then determines whether the leading edge of the original sheet has arrived at the reading area H of the reading unit 30 based on the signal received from the document sensor 72. The CPU 20 continues controlling the reading unit 60 to read the original sheet in S8 while the sheet has not yet arrived at the reading area H of the reading unit 30 (S10: NO).

When the CPU 20 determines that the leading edge of the original sheet has arrived at the reading area H of the reading unit 30 (S10: YES), the CPU 20 interrupts the operation of the reading unit 60 for reading the original sheet and executes a determination process in S12. At this time, the CPU 20 begins functioning as the determining unit 21 and operates in conjunction with the image processor 28. In this process, the CPU 20 compares the number of sub-region data sets having luminance less than the threshold K from among read data read by the reading unit 60 in S8 with a prescribed number F that has been pre-stored in the ROM 24, as illustrated in FIG. 5.

In S14 the CPU 20 (the determining unit 21) determines whether an image is present on the back surface of the original sheet based on whether the number of sub-region data sets having luminance less than the threshold K is greater than or equal to the prescribed number F. If the read data read in S8 includes unit image data having a luminance less than the threshold K numbering at least the prescribed number F (S14: YES), in S16 the CPU 20 functioning as the control unit 22 resumes controlling the reading unit 60 to read the original sheet. In other words, the control unit 22 controls the reading unit 60 to continue reading the back surface of the original sheet to acquire read data corresponding to the entire of the back surface, and controls the reading unit 30 to fail to read the front surface of the original sheet. In S18 the CPU 20 determines whether the trailing edge of the original sheet in the original sheet-conveying direction has passed over the reading area H of the reading unit 60 and continues controlling the reading unit 60 to read the original sheet while the trailing edge has not passed the reading area H (S18: NO). When the CPU 20 determines that the trailing edge of the original sheet has passed over the reading area H of the reading unit 60 (S18: YES), in other words, when the reading unit 60 has read the entire of back surface of the original sheet, the CPU 20 stops the reading unit 60 from reading original sheet and stores the read data read in S8 and S16 in the RAM 25 as read results for the original sheet.

However, if the CPU 20 determines in S14 that an image is not present on the back surface of the original sheet, i.e., that the number of sub-region data sets having a luminance less than the threshold K is less than the prescribed number F (S14: NO), in S20 the CPU 20 functioning as the control unit 22 halts the reading unit 60 from reading the back surface of original sheet. In S22 the CPU 20 functioning as the deleting unit 23 deletes the read data read by the reading unit 60 in S8. In S24 the CPU 20 functioning as the control unit 22 controls the reading unit 30 to read the front surface of the original sheet to acquire read data corresponding to the entire of front surface of the original sheet. In S26 the CPU 20 determines whether the trailing edge of the original sheet in the original sheet-conveying direction has passed over the reading area H of the reading unit 30. The CPU 20 continues to control the reading unit 30 to read the original sheet while the trailing edge has not passed the reading area H (S26: NO). When the CPU 20 determines that the trailing edge of the original sheet has passed the reading area H of the reading unit 30 (S26: YES), the CPU 20 stops the reading unit 30 from reading the original sheet and stores the read data read in S26 in the RAM 25 as the read results for the original sheet.

After the CPU 20 halts the reading unit 30 or reading unit 60 from reading the original sheet (S18 or S26: YES), signifying that the first sheet of the original (a first original sheet) has been read, in S28 the CPU 20 determines whether any original sheets remain in the original sheet tray 42 based on the signal received from the document sensor 70. If sheets do not remain in the original sheet tray 42 (S28: NO), the CPU 20 ends the current process. However, if the original sheets remain in the original sheet tray 42 (S28: YES), the CPU 20 returns to S4 and repeats the process described above.

4. Effects of the First Embodiment (1) When the MFP 1 according to the first embodiment described above reads an original sheet having an image formed on only one surface and the CPU 20 determines that an image exists on the back surface of the original sheet, the CPU 20 controls the reading unit 60 to read the original sheet as the sheet is conveyed thereby, while halting the reading unit 30 from reading the original sheet. If the CPU 20 determines that an image is not present on the back surface of the original sheet, the CPU 20 controls the reading unit 60 to read the original sheet until the original sheet is conveyed to the reading unit 30. After the original sheet arrives at the reading unit 30, the CPU 20 switches the reading unit used for reading the original sheet from the reading unit 60 to the reading unit 30, and subsequently controls the reading unit 30 to read the original sheet. Hence, when reading an original sheet having an image formed on only one surface, the MFP 1 having this configuration can determine which side of the original sheet bears an image, without reading both sides of the sheet simultaneously with the reading units 30 and 60. Accordingly, the present invention can reduce the load on the MFP 1 compared to the conventional technology that determines which surface of the original sheet bears an image by reading both sides of the original sheet simultaneously with the reading units 30 and 60.

(2) When the CPU 20 in the MFP 1 according to the first embodiment determines that an image is not present on the back surface of the original sheet, the CPU 20 deletes the read data read by the reading unit 60 in S8. In this case, read data read by the reading unit 60 in S8 is not included in the read results stored in the ROM 24. By deleting the data read by the reading unit 60, the MFP 1 according to the first embodiment requires less storage capacity in the RAM 25 than when this read data is not deleted.

(3) The CPU 20 determines that an image is formed on the back surface of the original sheet when the number of sub-region data sets having a luminance less than the threshold K among the read data read by the reading unit 60 in S8 is greater than or equal to the prescribed number F. Accordingly, the CPU 20 in the MFP 1 according to the first embodiment can use a reference such as the prescribed number F to determine accurately which surface of the original sheet bears an image. By using the image processor 28 to perform thresholding on the read data, the CPU 20 can definitively sort sub-region data into data having a luminance greater than or equal to the threshold K and data having a luminance less than the threshold K. Through this process, the CPU 20 can count the number of unit image data having a luminance less than the threshold K more reliably than when thresholding is not performed.

Second Embodiment

Next, a second embodiment of the present invention will be described with reference to FIGS. 6 and 7, where like parts and components are designated with the same reference numerals and similar steps are designated with the same step numbers to avoid duplicating description. The second embodiment differs from the first embodiment in the process for reading a plurality of original sheets with the ADF 40 when an image is formed on only one surface of each sheet. In the reading process according to the second embodiment, the MFP 1 reads the second and subsequent original sheets according to the results of the determination process for the first original sheet (i.e., the results for determining the reading surface of the first sheet).

1. Reading Process

Figure 6:
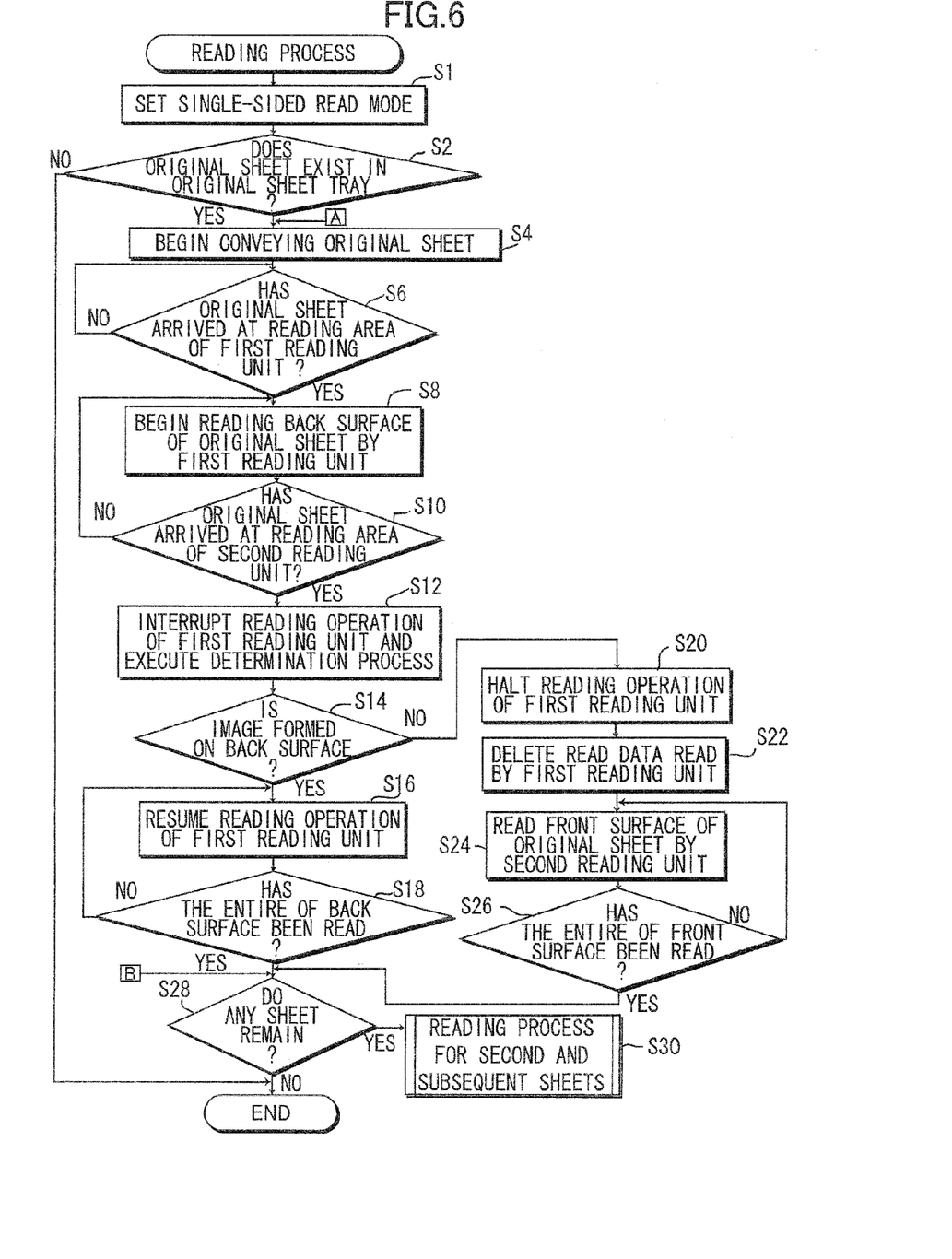
FIG. 6 is a flowchart illustrating steps in a reading process executed by an image reading device according to a second embodiment of the present invention.
Figure 7:
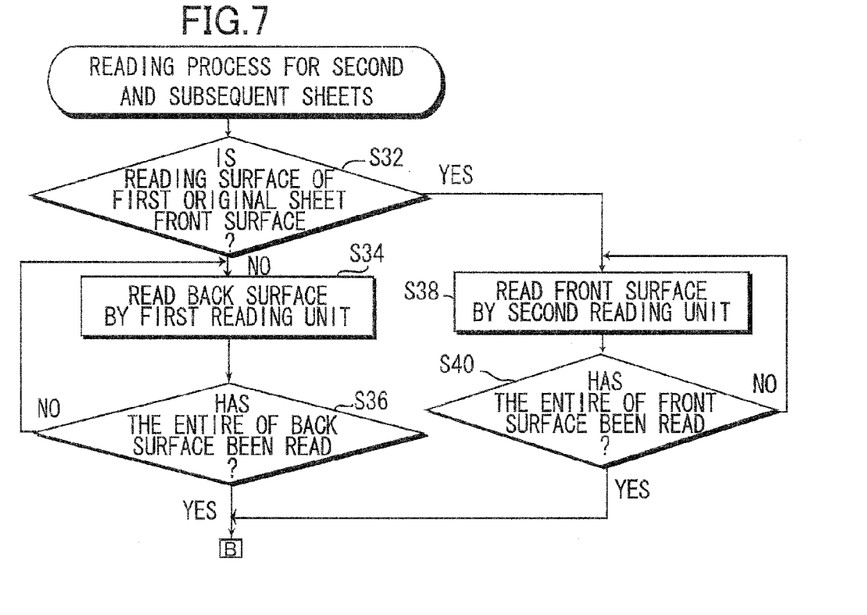
FIG. 7 is a flowchart illustrating steps in the reading process for second and subsequent sheets in the reading process of FIG. 6.

FIGS. 6 and 7 are flowcharts illustrating steps in a reading process according to the second embodiment. The CPU 20 executes the reading process based on a prescribed program. As shown in FIG. 6, after the CPU 20 completes reading of the first original sheet (S18 or S26: YES), in S28 the CPU 20 determines whether any original sheets remain in the original sheet tray 42 based on the signal received from the document sensor 70. When the original sheets remain in the original sheet tray 42 (S28: YES), in S30 the CPU 20 advances to a reading process for the second and subsequent sheets.

As shown in FIG. 7, in S32 of the reading process for the second and subsequent sheets, the CPU 20 determines the reading surface for the first original sheet. At this time, the CPU 20 functions as the determining unit 21 to determine whether the reading unit 30 was used to read the first original sheet.

If the CPU 20 determines that the reading unit 30 was not used to read the first original sheet (S32: NO), indicating that the reading surface for the first sheet was the back surface, in S34 the CPU 20 controls the reading unit 60 to read the back surface of the current sheet and does not use the reading unit 30 to read the front surface of the current sheet. In S36 the CPU 20 determines whether the trailing edge of the current sheet has passed the reading area H of the reading unit 60 and continues controlling the reading unit 60 to read the current sheet while the trailing edge has not passed the reading area H (S36: NO). When the CPU 20 determines that the trailing edge of the original sheet has passed the reading area H of the reading unit 60 (S36: YES), the CPU 20 halts the reading unit 60 from reading the current sheet.

However, if the CPU 20 determines in S32 that the reading unit 30 was used to read the first original sheet (S32: YES), indicating that the reading surface of the first sheet was the front surface, in S38 the CPU 20 controls the reading unit 30 to read the front surface of the current sheet and does not use the reading unit 60 to read the back surface of the current sheet. The CPU 20 continues controlling the reading unit 30 to read the original sheet while the trailing edge of the original sheet has not passed the reading area H of the reading unit 30 (S40: NO). When the trailing edge of the original sheet has passed the reading area H of the reading unit 30 (S40: YES), the CPU 20 halts the reading operation of the reading unit 30.

After the CPU 20 stops the reading unit 30 or reading unit 60 from reading the original sheet (S36 or S40: YES), ending the process for reading the second original sheet, the CPU 20 returns to S28 and determines whether any original sheets remain in the original sheet tray 42 based on the signal received from the document sensor 70. If there are no more original sheets in the original sheet tray 42 (S28: NO), the CPU 20 ends the current reading process. However, if the original sheets remain in the original sheet tray 42 (S28: YES), the CPU 20 returns to S32 and repeats the process described above.

2. Effects of the Second Embodiment

When reading a plurality of original sheets having an image formed on only one surface of each original sheet, the MFP 1 according to the second embodiment is configured to read the surface of the second and subsequent original sheets equivalent to the reading surface of the first original sheet. In other words, the MFP 1 is configured to read the second and subsequent original sheets using the same reading unit that was used to read the first original sheet. Hence, the MFP 1 need not determine which surface of the sheet possesses an image for second and subsequent sheets, thereby reducing processing load on the MFP 1.

Generally, when a user uses the ADF 40 to read a plurality of original sheets having an image formed on one surface of each sheet, the user will set the original sheet in the original sheet tray 42 with the surfaces bearing images facing the same way. Thus, the image-bearing surfaces of the original sheets conveyed along the conveying path 45 will be read by the same reading unit. Therefore, by reading the same surface of the second and subsequent original sheets as the surface read for the first original sheet, it is unlikely that the MFP 1 will mistakenly read a surface on which no image has been formed.

Third Embodiment

Next, a third embodiment of the present invention will be described with reference to FIG. 8, wherein like parts and components are designated with the same reference numerals and like steps are designated with the same step numbers to avoid duplicating description. When the ADF 40 in the MFP 1 according to the third embodiment is used to read a plurality of original sheets having an image formed on only one surface of each sheet, unlike in the first and second embodiments, the MFP 1 reads succeeding original sheets based on results of a determination process performed on previous original sheets that have already been read after the determination process has been performed on a plurality of original sheets.

1. Reading Process

Figure 8:
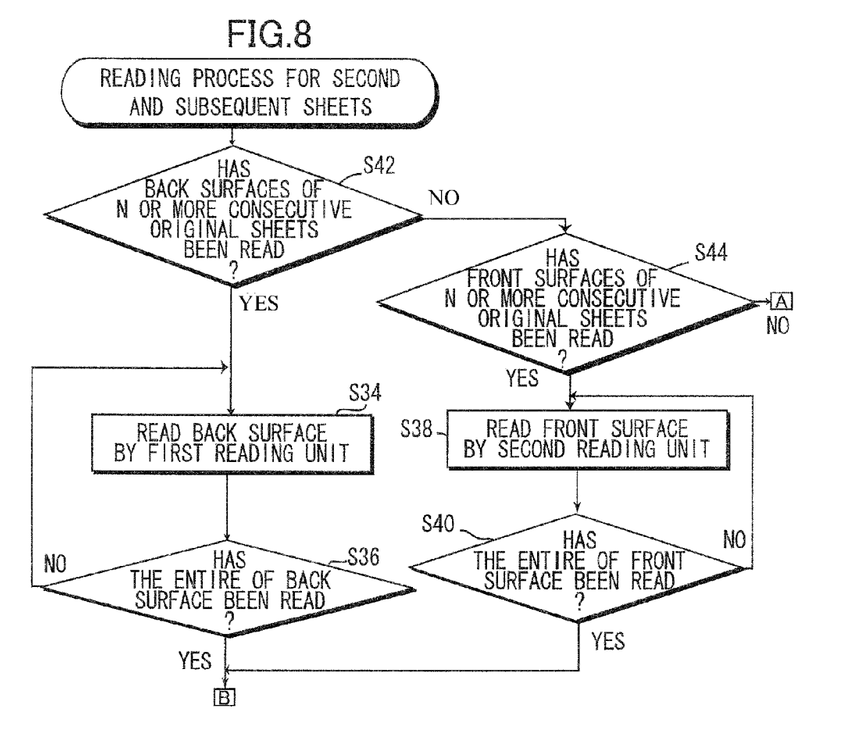
FIG. 8 is a flowchart illustrating steps in the reading process for second and subsequent sheets executed by an image reading device according to a third embodiment of the present invention.

FIG. 8 is a flowchart illustrating steps in a reading process according to the third embodiment. The CPU 20 executes the reading process according to the third embodiment based on a prescribed program. The process shown in FIG. 8 is the reading process for second and subsequent original sheets indicated in S30 of FIG. 6.

In the processes of S42 and S44 the CPU 20 determines which surfaces of the original sheets were read in the current reading operations and whether the reading surface of the original sheets read since the beginning of the current reading process was the same for N consecutive sheets, where "N" is a natural number other than "1". N denotes a prescribed number of sheets that has been preset by the user, for example. In these steps, the CPU 20 functions as the control unit 22.

If N number of the original sheets have not yet been read since the reading process began and prior to the sheet currently being read, or if the same reading unit has not been used to read N number of consecutive original sheets despite N or more original sheets being read (S42: NO, S44: NO), then the CPU 20 returns to S4 and repeats the process in S4 through S28 (see FIG. 6).

On the other hand, if N or more original sheets have been read since the reading process began and prior to the sheet currently being read and the reading unit 60 has been used to read N or more consecutive original sheets (S42: YES), in S34 the CPU 20 controls the reading unit 60 to read the back surface of the current sheet while halting the reading unit 30 from reading the front surface.

Similarly, if N or more original sheets have been read since the reading process began and prior to the sheet currently being read and the reading unit 30 has been used to read N or more consecutive original sheets (S42: NO, S44: YES), in S38 the CPU 20 controls the reading unit 30 to read the front surface of the current sheet while halting the reading unit 60 from reading the back surface.

2. Effects of the Third Embodiment

When the MFP 1 according to the third embodiment reads a plurality of original sheets having an image formed on only one surface of each sheet, the MFP 1 determines if N or more consecutive original sheets have been read with the same reading unit. That is, the CPU 20 determines whether the surfaces of the original sheets bearing images have been the same for N consecutive original sheets. If so, the MFP 1 begins to read subsequent original sheets using the reading unit corresponding to the surface read for N or more consecutive original sheets (i.e., the reading unit that has been used to read N or more consecutive original sheets). Hence, the MFP 1 need not determine which surface of the sheet possesses an image after N consecutive sheets, thereby reducing processing load on the MFP 1.

Variations of the Embodiments

While the invention has been described in detail with reference to the first, second, and third embodiments thereof, it would be apparent to those skilled in the art that various changes and modifications may be made therein without departing from the spirit of the invention, the scope of which is defined by the attached claims.

(1) In the first, second, and third embodiments, the present invention is applied to a MFP 1, but the present invention may be applied to any device possessing at least one of a printer function, scanner function, copier function, and facsimile function, for example.

(2) In the first, second, and third embodiments, the MFP 1 has a single ASIC 10, and the ASIC 10 possesses a single CPU 20 used to implement the functions of the determining unit 21, control unit 22, deleting unit 23, and the like. However, the units mentioned above may be configured with distinct and separate CPUs, ASICs, and the like.

(3) In the first, second, and third embodiments, the document sensors 71 and 72 are used as an example of devices for detecting the position of an original sheet conveyed along the conveying path 45. However, if the distance from the original sheet tray 42 to the reading areas H of the reading units 30 and 60 is known and the time required to convey a sheet from the conveying start point to each of the reading positions can be calculated based on the rotational speed at which the motor M and the drive circuit 16 rotate the rollers 46, then the position of an original sheet conveyed along the conveying path 45 can be identified based on the required conveying time.

(4) In the first, second, and third embodiments, the MFP 1 performs a thresholding process on read data in order to count the number of sub-region data sets having a luminance less than the threshold K, but a process other than thresholding may be employed. For example, the MFP 1 may read the luminance for each sub-region data set in the read data, compare each luminance to the threshold K, and count the number of sub-region data sets possessing a luminance less than the threshold K.

(5) In the first, second, and third embodiments, the MFP 1 compares the luminance of sub-region data within read data read from the back surface of an original sheet to the threshold K in order to determine whether the back surface bears an image. However, the MFP 1 may instead compare the chromaticity of the sub-region data constituting the read data with a suitable threshold value.

(6) Further, the reading unit 60 may read the front surface of the original sheet and the reading unit 30 may read the back surface of the original sheet. In this case, the CPU 20 determines whether or not the image formed on the front surface in S14.

What is claimed is:

1. An image reading device comprising:
   a housing defining a conveying path for conveying sheets having first and second sides;
   a first reading unit configured to read data on the first sides of the sheets conveyed along the conveying path;
   a second reading unit disposed downstream of the first reading unit with respect to the conveying path, the second reading unit configured to read data on the second sides of the sheets conveyed along the conveying path; and a controller configured to:
  determine, based on first read data obtained from the first side of a first sheet with the first reading unit before the first sheet has arrived at the second reading unit, whether an image is formed on the first side of the first sheet;
  control the first reading unit to continue reading the first side of the first sheet to acquire second read data including the first read data and data different from the first read data, and the second reading unit does not obtain data from the second side of the first sheet, when the controller determines that an image is formed on the first side of the first sheet; and
  control the second reading unit to read the second side of the first sheet to acquire third read data different from the first and second read data and stop the reading of the first side of the first sheet by the first reading unit, when the controller determines that an image is not formed on the first side of the first sheet.

2. The image reading device according to claim 1 further comprising:
  a memory configured to store the first read data when the first reading unit acquires the first read data; and
  wherein the controller is configured to delete the first read data stored in the memory when the controller determines that an image is not formed on the first side of the first sheet.

3. The image reading device according to claim 1, wherein the controller is configured to store the second read data in the memory when the controller determines that an image is formed on the first side of the first sheet; and
  to store the third read data in the memory when the controller determines that an image is not formed on the first side of the first sheet.

4. The image reading device according to claim 1, wherein the controller is configured to judge whether a subsequent sheet to be read is present;
  wherein when the subsequent sheet is present and the controller determines that an image is formed on the first side of the first sheet, the controller controls the first reading unit to read the first side of the subsequent sheet and the second reading unit does not obtain data from the second side of the subsequent sheet;
  wherein when the subsequent sheet is present and the controller determines that an image is not formed on the first side of the first sheet, the controller controls the second reading unit to read the second side of the subsequent sheet and the first reading unit does not obtain data from the first side of the subsequent sheet.

5. The image reading device according to claim 1, wherein when a plurality of sheets to be read are present, the controller determines whether an image is formed on the first side of each sheet;
  wherein the controller is further configured to:
    determine whether an image is formed on the first side of each of N-number of sheets consecutively, where N is an integer greater than 1; and
    determine whether an image is not formed on the first side of each of N-number of sheets consecutively;
  wherein when the controller determines that an image is formed on the first side of each of N-number of sheets consecutively, the controller controls the first reading unit to read the first side of each subsequent sheet to be read and the second reading unit does not obtain data from the second side of each subsequent sheet;
  wherein when the controller determines that an image is not formed on the first side of each of N-number of sheets consecutively, the controller controls the second reading unit to read the second side of each subsequent sheet to be read and the first reading unit does not obtain data from the first side of each subsequent original sheet.

6. The image reading device according to claim 1, wherein the first side of the first sheet has a prescribed area that is read by the first reading unit when the first sheet has arrived at the second reading unit, the prescribed area including a plurality of sub-regions, the first reading unit being configured to acquire a plurality of densities each corresponding to the plurality of sub-regions,
  wherein the controller is further configured to determine whether a number of sub-regions each having a density higher than or equal to a prescribed threshold density is greater than or equal to a predetermined number;
  wherein the controller determines that an image is formed on the first side of the first sheet when the controller determines that the number of sub-regions each having a density higher than or equal to a prescribed threshold density is greater than or equal to the predetermined number.

7. The image reading device according to claim 6, wherein the controller is configured to sort each of the plurality of sub-regions into a first sub-region and a second sub-region, the first sub-region having a density higher than or equal to the prescribed threshold density and the second sub-region having a density lower than the prescribed threshold density;
  wherein the controller determines whether a number of first sub-regions is greater than or equal to a predetermined number;
  wherein the controller determines that an image is formed on the first side of the first sheet when the controller determines that the number of first sub-regions is greater than or equal to the predetermined number.

8. The image reading device according to claim 1, the controller is further configured to set the image reading device to a single-sided read mode in which only one of the first side and the second side of sheets should be read;
  wherein the controller determines, when the single-sided read mode is set, whether an image is formed on the first side of the first sheet based on at least part of first read data;
  wherein the controller controls the first reading unit to continue reading the first side of the first sheet to acquire the second read data and the second reading unit does not obtain data from the second side of the first sheet when the controller determines that an image is formed on the first side of the first sheet; and
  wherein the controller controls the second reading unit to read the second side of the first sheet to acquire the third read data and stop the reading of the first side of the first sheet by the first reading unit when the controller determines that an image is not formed on the first side of the first sheet.

9. The image reading device according to claim 1, further comprising
  a first document sensor disposed upstream of the first reading unit in the conveying path and configured to detect the sheets; and
  a second document sensor disposed between the first reading unit and the second reading unit in the conveying path and configured to detect the sheets, wherein the controller is further configured to:
- control the first reading unit to read the first side of the first sheet from a first timing until a second timing to acquire the first read data, the first timing corresponding to a timing at which the first sheet is detected by the first document sensor, the second timing corresponding to a timing at which the first sheet is detected by the second document sensor.

10. An image reading method comprising:
- reading a first side of a first sheet by a first reading unit of an image reading device before the first sheet has arrived at a second reading unit of the image reading device, the second reading unit being disposed downstream of the first reading unit with respect to a conveying path;
- determining, based on first read data read by the first reading unit, whether an image is formed on the first side of the first sheet;
- controlling the first reading unit to continue reading the first side of the first sheet to acquire second read data including the first read data and data different from the first read data, and the second reading unit does not obtain data from the second side of the first sheet when an image is formed on the first side of the first sheet; and
- controlling the second reading unit to read the second side of the first sheet to acquire third read data different from the first and second read data and stopping the reading of the first side of the first sheet when an image is not formed on the first side of the first sheet.

11. A non-transitory computer readable storage medium storing a set of program instructions installed on and executed by a computer for controlling an image reading device, the program instructions comprising:
- reading a first side of a first sheet by a first reading unit of an image reading device before the first sheet has arrived at a second reading unit of the image reading device, the second reading unit being disposed downstream of the first reading unit with respect to a conveying path;
- determining, based on first read data read by the first reading unit, whether an image is formed on the first side of the first sheet;
- controlling the first reading unit to continue reading the first side of the first sheet to acquire second read data including the first read data and data different from the first read data, and the second reading unit does not obtain data from the second side of the first sheet when an image is formed on the first side of the first sheet; and
- controlling the second reading unit to read the second side of the first sheet to acquire third read data different from the first and second read data and stopping the reading of the first side of the first sheet when an image is not formed on the first side of the first sheet.

\* \* \* \* \*